(12) United States Patent
Li

(10) Patent No.: US 10,396,956 B2
(45) Date of Patent: Aug. 27, 2019

(54) CHANNEL IDENTIFICATION IN A MIMO TELECOMMUNICATIONS SYSTEM

(71) Applicant: CommScope Technologies LLC, Hickory, NC (US)

(72) Inventor: Zhao Li, Forest, VA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/549,057

(22) PCT Filed: Jan. 26, 2016

(86) PCT No.: PCT/US2016/014821
§ 371 (c)(1),
(2) Date: Aug. 4, 2017

(87) PCT Pub. No.: WO2016/130310
PCT Pub. Date: Aug. 18, 2016

(65) Prior Publication Data
US 2018/0026760 A1    Jan. 25, 2018

Related U.S. Application Data

(60) Provisional application No. 62/114,658, filed on Feb. 11, 2015.

(51) Int. Cl.
*H04L 12/801* (2013.01)
*H04L 12/24* (2006.01)
(Continued)

(52) U.S. Cl.
CPC ........... *H04L 5/005* (2013.01); *H04B 7/0413* (2013.01); *H04L 5/0023* (2013.01); *H04L 27/26* (2013.01);
(Continued)

(58) Field of Classification Search
CPC .. H04L 5/005; H04L 27/2692; H04W 88/085; H04B 7/0413
See application file for complete search history.

(56) References Cited

U.S. PATENT DOCUMENTS 3,369,177 A    2/1968    Graham et al.
9,307,462 B2 *  4/2016    Hu .................... H04B 7/024
(Continued)

FOREIGN PATENT DOCUMENTS

WO    2013035052    3/2013

OTHER PUBLICATIONS

International Search Authority, "International Search Report and Written Opinion for PCT Application PCT/US201610/4821", Apr. 29, 2016, pp. 1-13, Published in: US.
(Continued)

*Primary Examiner* — Faruk Hamza
*Assistant Examiner* — Abusayeed M Haque
(74) *Attorney, Agent, or Firm* — Fogg & Powers LLC

(57) ABSTRACT

A channel identification system and method are provided to automatically identify ports of a base station (e.g., an eNodeB) to route downlink signals to appropriate access points in a telecommunication system. Primary and secondary synchronization signals may be identified in the downlink signals transmitted by the base station. A broadcast channel may be decoded for a downlink signal including the primary and secondary synchronization signals. Signal information may be used to extract a first cell-specific reference signal and generate a second cell-specific reference signal corresponding to one or more ports of the base station. The first and second cell-specific reference signals may be correlated to verify the identity of the channel corresponding to the ports of the base station.

17 Claims, 6 Drawing Sheets

(51) Int. Cl.
*H04L 5/14* (2006.01)
*H04L 12/28* (2006.01)
*H04L 5/00* (2006.01)
*H04L 27/26* (2006.01)
*H04B 7/0413* (2017.01)
*H04W 88/08* (2009.01)

(52) U.S. Cl.
CPC ...... *H04L 27/2613* (2013.01); *H04L 27/2655* (2013.01); *H04L 27/2692* (2013.01); *H04W 88/085* (2013.01)

(56) References Cited

U.S. PATENT DOCUMENTS

| | | | |
|---|---|---|---|
| 2003/0085837 A1* | 5/2003 | Abraham | G01S 19/235 342/357.64 |
| 2008/0058018 A1 | 3/2008 | Scheinert | |
| 2009/0029670 A1* | 1/2009 | Cho, II | G01C 21/00 455/344 |
| 2009/0154621 A1* | 6/2009 | Shapira | G01S 3/023 375/347 |
| 2013/0203419 A1 | 8/2013 | Siomina et al. | |
| 2013/0272250 A1 | 10/2013 | Shimezawa et al. | |
| 2014/0126568 A1* | 5/2014 | Berggren | H04W 56/0015 370/350 |
| 2014/0171097 A1* | 6/2014 | Fischer | H04W 4/02 455/456.1 |
| 2014/0254567 A1* | 9/2014 | Han | H04W 76/14 370/336 |
| 2014/0269318 A1 | 9/2014 | Hasarchi et al. | |
| 2015/0148050 A1* | 5/2015 | Siomina | H04J 11/005 455/452.1 |
| 2015/0270922 A1* | 9/2015 | Breuer | H04B 1/1027 455/423 |

OTHER PUBLICATIONS

3GPP TSG-RAN WG4 Meeting # AH-04, "Impact of Enhanced ICIC for Non-CA based Deployment on RAN4 Requirements", Ericsson, ST-Ericsson, 9.7.1, Dated Oct. 11-15, 2010, p. 1-5, Published in: CN.

3rd Generation Partnership Project (3GPP), "Technical Specification Group Radio Access network; Evolved Universal Terrestreial Radio Access (E-UTRA); Physical Channels and Modulation (Release 11)", Dated Dec. 2012, p. 1-5.

European Patent Office, "Extended European Search Report from EP Application No. 16749581.1 dated Mar. 27, 2018", "from Foreign Counterpart of U.S. Appl. No. 15/549,057", Aug. 27, 2018, p. 1-7, Published in: EP.

* cited by examiner

CHANNEL IDENTIFICATION IN A MIMO TELECOMMUNICATIONS SYSTEM

CROSS-REFERENCE TO RELATED APPLICATION

This application is a U.S. National Stage application of PCT Application Serial No. PCT/US2016/014821, filed Jan. 26, 2016, and titled "CHANNEL IDENTIFICATION IN A MIMO TELECOMMUNICATION SYSTEM," which claims the benefit of U.S. Provisional Application Ser. No. 62/114,658, filed Feb. 11, 2015, and titled "Channel Identification in a MIMO Telecommunications System," the contents of all of which are incorporated herein by reference.

TECHNICAL FIELD

The present disclosure relates generally to telecommunications, and, more particularly (although not necessarily exclusively), to multi-input, multi-output ("MIMO") channel identification in a telecommunication system.

BACKGROUND

A telecommunication system may include a distributed antenna system ("DAS") or a repeater that may be used to extend the coverage of a cellular communication system. For example, a DAS may extend coverage to areas of traditionally low signal coverage within buildings, tunnels, or in areas obstructed by terrain features. The telecommunication system may be communicatively coupled to one or more base stations, including, but not limited to, an eNodeB ("eNB"), that is compliant with a Long Term Evolution ("LTE") standard.

A DAS, for example, may include one or more head-end units (e.g., master units) that are communicatively coupled to the base stations. The head-end units may be coupled to ports of the base stations to form channels between the head-end units and the respective base station ports. The DAS may also include multiple access points or remote units that are communicatively coupled to a base station via a head-end unit. The remote units, each of which may include one or more transceivers and antennas, may be distributed across a coverage area of the DAS. The remote units may transmit downlink signals to mobile phones or other terminal devices within coverage areas serviced by the remote units or access points and may receive uplink signals from the terminal devices. Properties of the channels between the base stations and the head-end units may be used to route the downlink signals to an appropriate access point or base station. But, maintaining channel properties corresponding to the downlink signals may require knowledge of the connections between the base stations and the telecommunication system during installation of the head-end units to manually identify the channels associated with each port of the base stations.

SUMMARY

According to one aspect of the present disclosure, an identification system may include an interface device and a processing device for identifying channels on which signals are transmitted between a base station and the interface device. The interface device may be communicatively couplable to at least two ports of the base station to receive downlink signals from the base station. The processing device may be couplable to the interface device. The processing device may execute instructions configured to cause the processing device to extract a first cell-specific reference signal from either (a) a downlink signal that does not have the embedded synchronization signal or (b) a downlink signal traversing the secondary channel. The instructions may also cause the processing device to generate a second cell-specific reference signal using signal information from at least one of the downlink signals. The instructions may also cause the processing device to determine a channel identification for one of the ports of the base station by correlating the first cell-specific reference signal and the second cell-specific reference signal.

According to another aspect of the present disclosure, a telecommunication system may include a head-end unit communicatively couplable to at least two ports of a base station to receive downlink signals from the base station. The head-end unit may be configured to extract a first cell-specific reference signal from a downlink signal or signals having the embedded synchronization signal. The head-end unit may also be configured to generate a second cell-specific reference signal using signal information from at least one of the downlink signals. The head-end unit may also be configured to determine a channel identification for one of the ports of the base station by correlating the first cell-specific reference signal and the second cell-specific reference signal.

According to another aspect of the present disclosure, a method may include extracting a first cell-specific reference signal from one of the plurality of signals having an embedded synchronization signal. The method may also include generating a second cell-specific reference signal using signal information from at least one of the plurality of signals. The method may also include determining a channel identification for a port of a base station by correlating the first cell-specific reference signal and the second cell-specific reference signal.

The details of one or more aspects and examples are set forth in the accompanying drawings and the description below. Other features and aspects will become apparent from the description, the drawings, and the claims.

DETAILED DESCRIPTION

Figure 1:
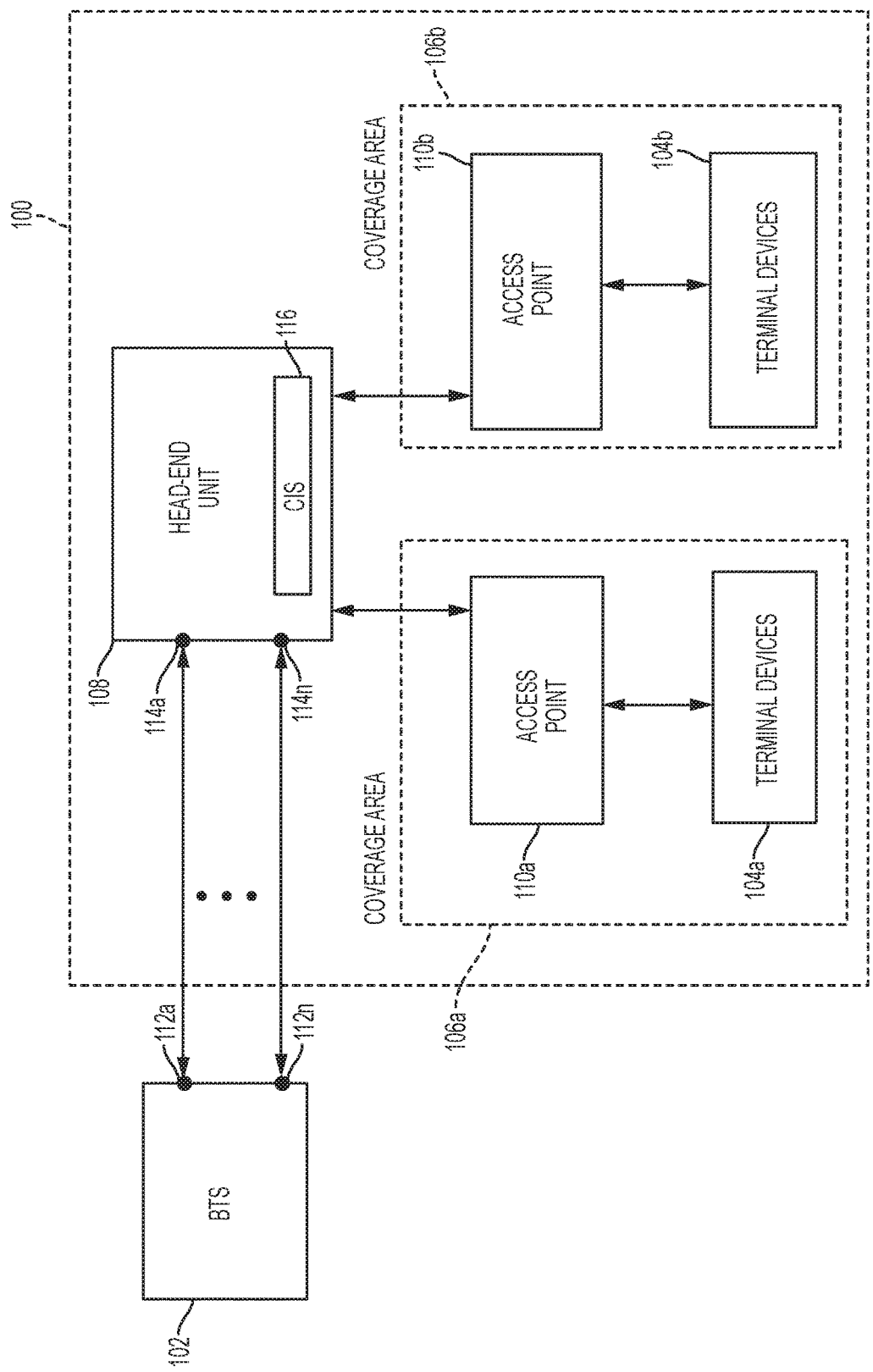
FIG. 1 is a block diagram of an example of an environment for a telecommunication system that may include a channel identification system according to one aspect of the present disclosure.

Certain aspects and features relate to a channel identification system for identifying multi-input, multi-output ("MIMO") channels in a telecommunication system during installation and without knowledge of the respective MIMO channel properties. Each channel in the telecommunication system may correspond to a port of a base station communicatively coupled to the telecommunication station for transmitting downlink signals from the base station to the telecommunication system. In some aspects, the identity of each channel may include a port number. A channel identification system may be positioned in the telecommunication system to receive the downlink signals and extract signal information for determining the identity of each channel transmitting the downlink signals from the base station. In some aspects, the channels may include a primary channel and one or more secondary channels between the ports of the base station and ports of the telecommunication system. The primary channel may include the channel having a higher data rate than the other channels transmitting downlink signals from the base station. Primary and secondary synchronization signals may be embedded in one or more downlink signals and transmitted from the base station on one or more of the channels.

The channel identification system may extract a cell-specific reference signal sequence from a downlink signal that does not include an embedded primary and secondary synchronization signals, or, in instances where a primary and secondary synchronization signals are transmitted on multiple channels, the cell-specific reference signal sequence may be extracted from a downlink signal including synchronization signals and traversing a secondary channel. In some aspects, the synchronization signals may include specific signal information to identify the port from which it was transmitted. The channel identification system may correlate the extracted cell-specific reference signal with a second cell-specific reference signal generated from the signal information from one of the downlink signals to determine whether the downlink signals were transmitted from the same base station port.

In some aspects, the port number of a signal may be necessary to maintain at least a portion of the MIMO channel properties to route the downlink signals to an appropriate access point. The use of a channel identification system according to some aspects, may increase efficiency and ease in installing a telecommunication system by removing technician labor to predetermine the connections between the ports of a base station and the telecommunication system. A channel identification system according to some aspects may also increase efficiency of the telecommunication system itself. Transmitting the downlink signals with the MIMO channel properties may allow the use of multi-antenna spatial multiplexing or beam-forming between a base station, or an eNB, and the mobile devices or user equipment ("UE") communicatively coupled to the access points. Multi-antenna spatial multiplexing and beam-forming may allow the access points to achieve higher data capacity and better coverage in the telecommunication system.

Detailed descriptions of certain examples are discussed below. These illustrative examples are given to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure. The various figures described below depict examples of implementations for the present disclosure, but should not be used to limit the present disclosure.

FIG. 1 shows a block diagram depicting an example of a telecommunication system 100 that may include a channel identification system according to one aspect. The telecommunication system 100 may communicate signals between a base station 102 in communication with the telecommunication system 100 and terminal devices 104a, 104b located coverage areas 106a, 106b, respectively, serviced by the telecommunication system 100. Non-limiting examples of a telecommunication system 100 may include a DAS or a repeater network. The terminal devices 104a, 104b located in the coverage areas 106a, 106b serviced by the telecommunication system 100 may include electronic devices (e.g., mobile devices) used to communicate voice or other data via the telecommunication system 100.

The telecommunication system 100 may communication signals to the terminal devices via a head-end unit 108 and one or more access points 110a, 110b servicing the coverage areas 106a, 106b of the telecommunication system 100 The head-end unit 108 may be communicatively coupled to the base station 102 via any suitable manner. Communicatively coupling devices in a telecommunication system 100 can involve establishing, maintaining, or otherwise using a communication link (e.g., a cable, an optical fiber, a wireless link, etc.) to communicate information between the devices. The head-end unit 108 may receive downlink signals from a telecommunication provider network via the base station 102 and may transmit uplink signals to the telecommunication provider network via the base station 102. The access points 110a, 110b may provide signal coverage in the coverage areas 106a, 106b, respectively, served by the telecommunication system 100. In some aspects, the access points 110a, 110b may include transceiving device that may include or be communicatively coupled to one or more ports. A non-limiting example of an access point may include a remote antenna unit. Providing signal coverage in the coverage area can include wirelessly transmitting downlink signals received from the head-end unit 106 to terminal devices that are positioned in the coverage area. Providing signal coverage may also include wirelessly receiving uplink signals from the terminal devices 104a, 104b positioned in the respective coverage areas 106a, 106b of the telecommunication system 100. The access points 110a, 110b may transmit the uplink signals, or data representing the uplink signals, such as packetized data generated from received uplink signals, to the head-end unit 108.

The head-end unit 108 may include transmitter elements and receiver elements for communicating with the base station 102. In some examples, the head-end unit 108 may be configured for single input/single output (SISO) operation using a single transmitter element for transmitting uplink signals to the base station 102 and a single receiver element for receiving downlink signals from the base station 102. In other examples, the head-end unit 108 may include multiple receiver elements and transmitter elements to receive and transmit signals between the base station 102 and the head-end unit 108. In such examples, the head-end unit 108 may be configured to operate in a multi-input/multi-output (MIMO) mode. FIG. 1 shows an example of the head-end unit 108 in a MIMO configuration. The base station 102 includes multiple ports 112a-n communicatively coupled to multiple ports 114a-n of the head-end unit 108 to allow the head-end unit to operate in the MIMO configuration via channels between the respective ports 112a-n, 114a-n. In some aspects, the ports 112a-n, 114a-n may be configured to transmit or receive analog signals (e.g., antenna ports). In additional and alternative aspects, the ports 112a-n, 114a-n may be configured to receive digital signals (e.g., where the base station 102 includes a baseband unit transmitting digital signals).

For purposes of illustration, FIG. 1 depicts direct connections between the base station and the telecommunication system 100 and between the head-end unit 108 and the access points 110a, 110b in the telecommunication system 100. But, the telecommunication system 100 may use any suitable implementation for communicatively coupling the devices. In some examples, the head-end unit 108 may be communicatively coupled to the access points 110a, 110b or base station 102, or both, via one or more active devices, including, but not limited to, extension units, switches, routers, or other intermediate devices. An active device may include a receiver for receiving a signal from one device in the telecommunication system 100 and a transmitter for transmitting the received signal to another device in the telecommunication system 100. In additional or alternative aspects, the head-end unit 108 can be communicatively coupled to the access points 110a, 110b or base station 102, or both, via one or more passive interfaces, including, but not limited to, a network cable or an air interface via which wireless signals can be communicated. Although the telecommunication system 100 in FIG. 1 shows only one head-end unit 108 and two access points 110a, 110b, a telecommunication system may include any number of head-end units or access points without departing from the scope of the present disclosure. Also, the telecommunication system 100 may be communicatively couplable to multiple base stations without departing from the scope of the present disclosure.

The telecommunication system 100 may include a channel identification system 116 for identifying from which channel corresponding to ports 112a-n of the base station 102 downlink signals are received. In some aspects, the channel identification system 116 may be located in the head-end unit 106 as shown in FIG. 1, although other placements for the channel identification system 116 are possible without departing from the scope of the present disclosure.

Figure 2:
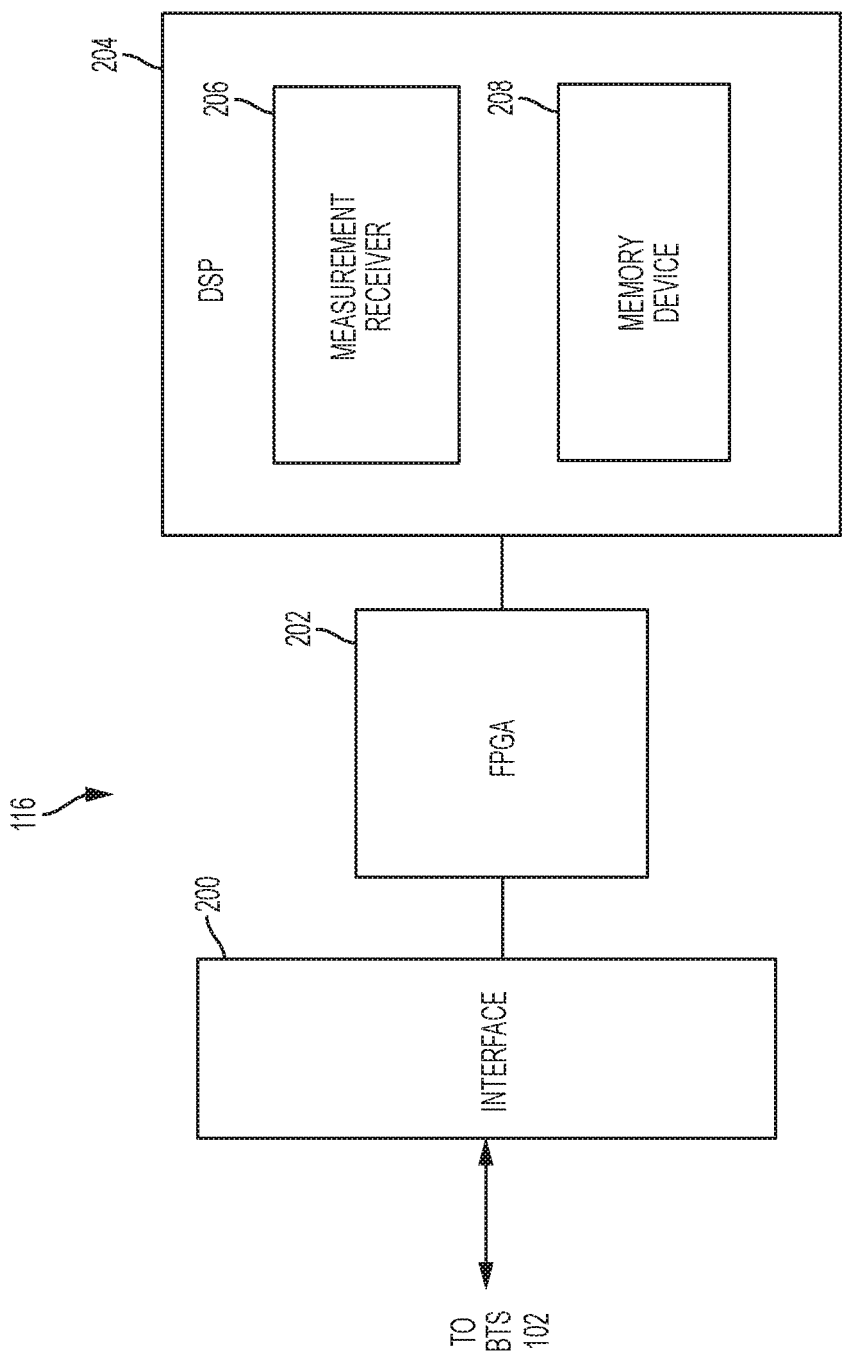
FIG. 2 is a block diagram of a channel identification system that may be included in a telecommunication system according to one aspect of the present disclosure.

FIG. 2 is a simple block diagram showing an example of the channel identification system 116 that may be included in the telecommunication system of FIG. 1. The channel identification system 116 includes an interface device 200. The interface device may be a base transceiver station (BTS) interface device for communicating or otherwise interfacing with a base station in a telecommunication (e.g., base station 102 in FIG. 1). In some aspects, the interface device 200 may include a donor card. In some aspects, the interface device 200 may be communicatively coupled to the ports 114a-n of the head-end unit 108 of FIG. 1 to receive downlink signals from the base station 102 of FIG. 1 via the channels. In additional and alternative aspects, the interface device 200 may include one or more analog-to-digital converters for digitizing the downlink signals received from the base station 102.

The channel identification system 116 may also include one or more processing devices communicatively coupled to the interface device 200. In the example shown in FIG. 2, processing devices of the channel identification system 116 may include a field programmable gate array (FPGA) 202 and a digital signal processor (DSP) 204 communicatively coupled to the interface device 200. Although only two processing devices are shown in the channel identification system 116 in FIG. 2, the channel identification system 116 may include any number of processing devices for executing the channel identification system functionalities described herein, including one. Similarly, although the field programmable gate array 202 and the digital signal processor 204 are shown, the processing devices of the channel identification system 116 may include one or more additional or alternative processing devices, including, but not limited to a microprocessor, an application-specific integrated circuit (ASIC), and state machines. In some aspects, the digital signal processor 204 may include a board connected to the backplane of the head-end unit 108.

In some aspects, the field programmable gate array 202 may be configured to perform synchronous capture of the downlink signals received from the interface device 200. In additional and alternative aspects, the digital signal processor 204 may be configured to process the downlink signals captured by the field programmable gate array 202. In some aspects, the digital signal processor 204 may include a measurement receiver 206 and a memory device 208 as shown in FIG. 2. The measurement receiver 206 may be a receiver device configured to measure the characteristics of signal received from a base station communicatively coupled to the telecommunication system in which the channel identification system 116 is located (e.g., base station 102 in telecommunication system 100). The measurement receiver 206 may be communicatively coupled to the memory device 208. The memory device 208 may include any type of memory device that retains stored information when powered off. Non-limiting examples of the memory device 208 may include electrically erasable and programmable read-only memory (EEPROM), flash memory, or any other type of non-volatile memory. In some examples, at least a portion of the memory device 208 may include a medium from which the measurement receiver 206 can read instructions 210 for carrying out one or more channel identification functionalities. The instructions 210 may include processor-specific instructions generated by a compiler or an interpreter from code written in any suitable computer-programming language, including, for example, C, C++, C#, etc.

In some examples, the instructions 210 may include the following general equation for defining a cell-specific reference signal:

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1,$$

where $n_s$ is a slot number within a radio frame and l is an orthogonal frequency-division multiplexing (OFDM) symbol number within the slot. In some aspects, the cell-specific reference signals may be a type of Gold sequence having sufficient auto-correlation properties in code division multiple access (CDMA) applications. Cell-specific reference signals may be a function of a slot number ($n_s$), an orthogonal frequency-division multiplexing ("OFDM") symbol number (1), a cell ID, and a cyclic prefix mode.

The cell-specific reference signals may be a type of Gold sequence having sufficient auto-correlation properties in code division multiple access (CDMA) applications. In some aspects, pseudo-random sequences may be defined by a length-31 Gold sequence. The instructions 210 may also include the following general equations for defining an output sequence c(n) of length $M_{PN}$, where n=0, 1, ..., $M_{PN}$−1:

$$c(n)=(x_1(n+N_C)+x_2(n+N_C)) \bmod 2$$

$$x_1(n+31)=(x_1(n+3)+x_1(n)) \bmod 2$$

$$x_2(n+31)=(x_2(n+3)+x_2(n+2)+x_2(n+1)+x_2(n)) \bmod 2,$$

where $x_1$ and $x_2$ represent block vectors from component PN generators and $N_c$ is a constant equal to 1600. In some aspects, a first shift register may be initialized with all zeros and a second shift register may be initialized at the start of each OFDM symbol with the following relationship that may be included in the instruction 210:

$$c_{init}=2^{10} \cdot (7 \cdot (n_s+1)+l+1) \cdot (2 \cdot N_{ID}^{cell}+1)+2 \cdot N_{ID}^{cell}+N_{CP},$$

where $N_{CP}$ represents the downlink cyclic prefix length that is equal to 1 for a normal cyclic cell prefix and 0 for an extended cyclic prefix, ID is the physical layer cell identity, and $n_s$ is the slot number within a radio frame.

Figure 3:
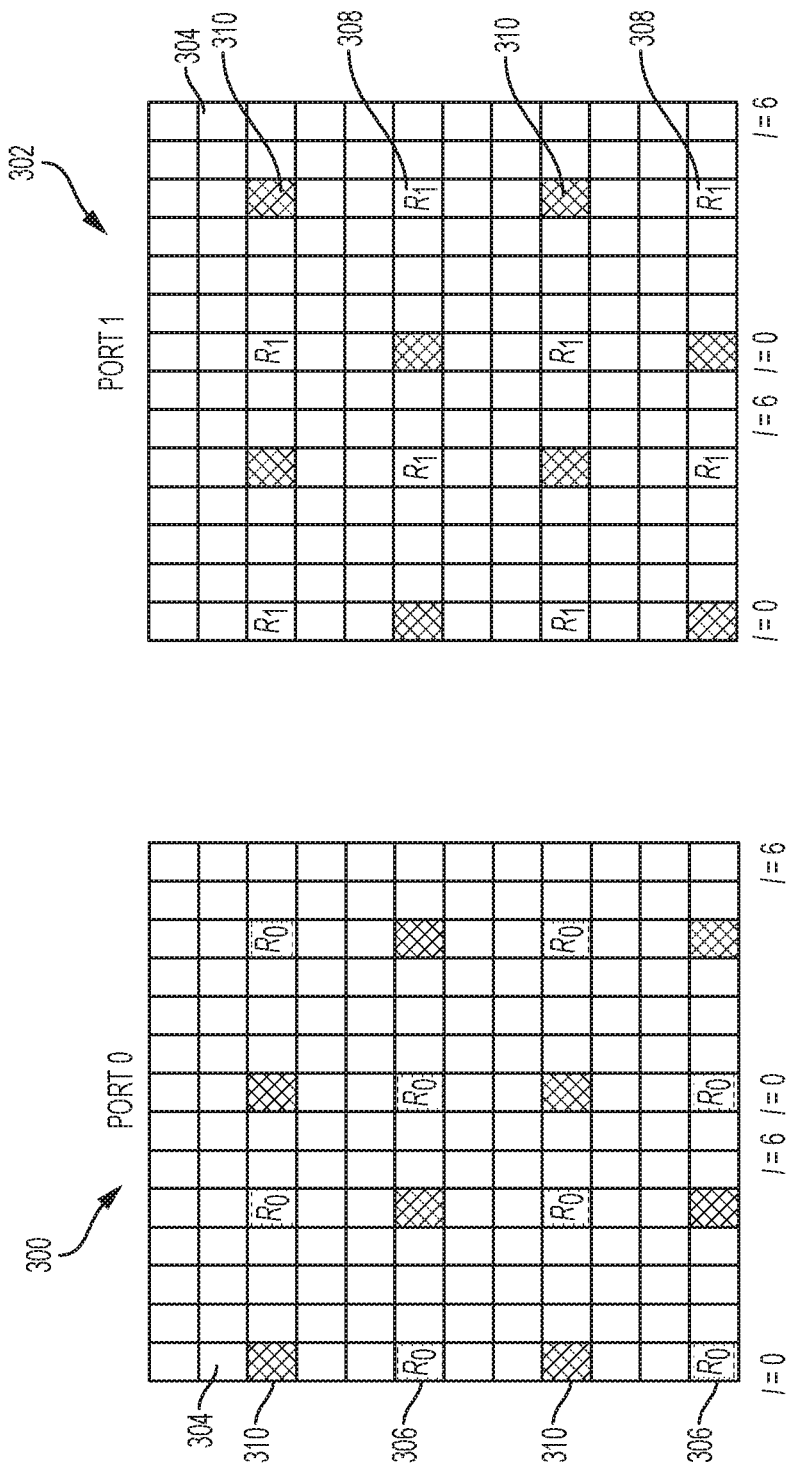
FIG. 3 is a graphical mapping of downlink reference signals for a 2×2 MIMO telecommunication system according to one aspect of the present disclosure.
Figure 4:
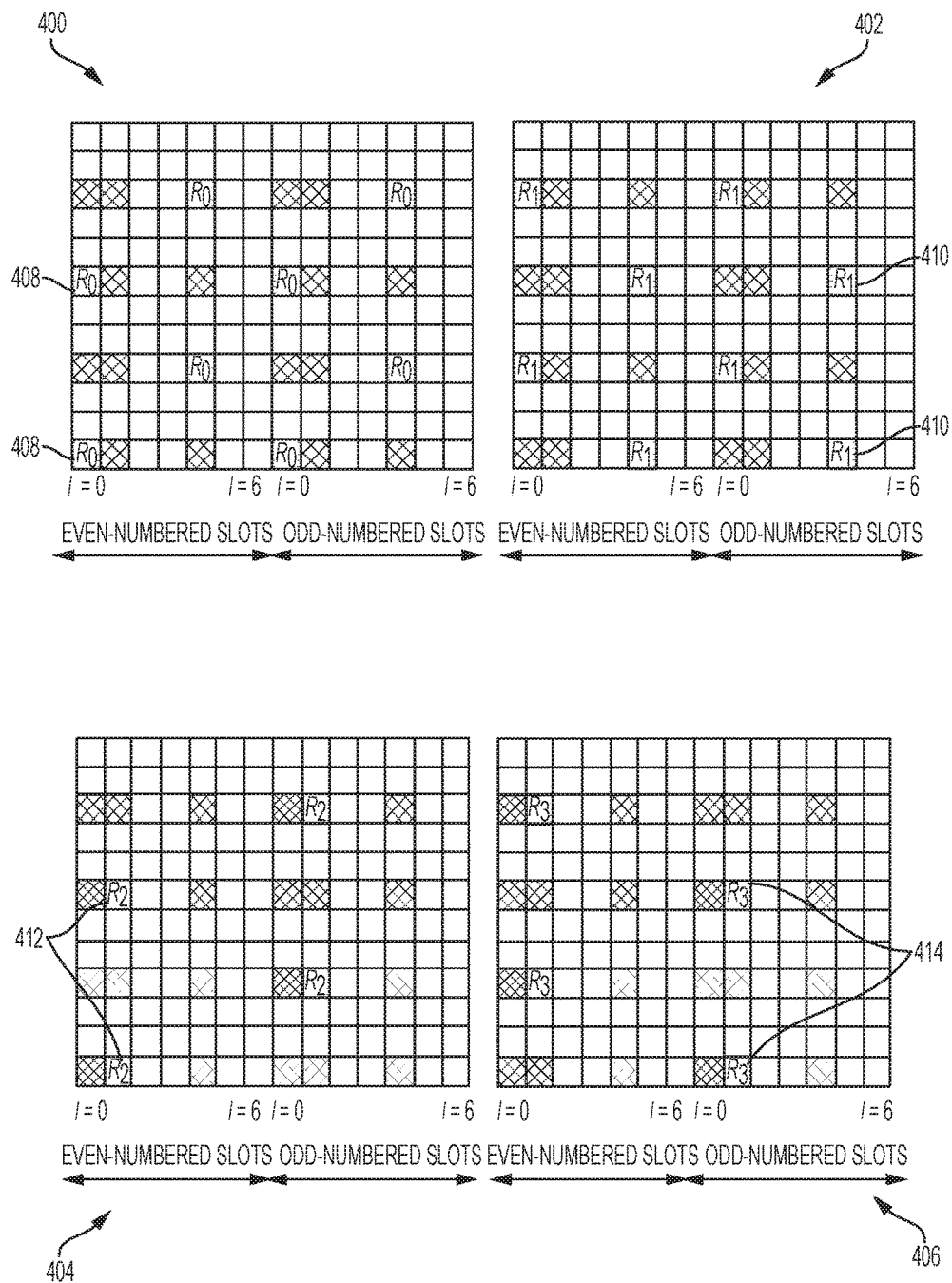
FIG. 4 is a graphical mapping of downlink reference signals for a 4×4 MIMO telecommunication system according to one aspect of the present disclosure.

In some aspects, the location of the downlink cell-specific reference signals may be mapped for each port 112a-n, 114a-n transmitting or receiving the signals, respectively, via the channels. FIGS. 3 and 4 show examples of a graphical mapping of downlink cell-specific reference signals corresponding to information that may be stored as instructions 210. In FIG. 3, the cell-specific reference signals may be transmitted via one or more channels and used to identify the remaining channels in a 2×2 MIMO telecommunication system. The map includes grids 300, 302 representing a first port (e.g., port {0}) and a second port (e.g., port {1}), respectively. In some aspects, the grids 300, 302 may represent two of the ports 114a-n of the head-end unit 108 of FIG. 1. In other aspects, the grids 300, 302 may represent or correspond to two of the ports 112a-n of the base station 102 of FIG. 1. Each grid 300, 302 may include slots 304, each representing a resource element with a frequency-domain index time index (l) and a time-domain index (k). A resource element may include the smallest time-frequency unit for a downlink transmission.

Grid 300 may include slots 306, a subset of the slots 304 having an $R_0$ and indicating that a cell-specific reference signal is transmitting a resource element in the slot 304, 306. Similarly, grid 302 may include slots 308, a second subset of the slots 304 having an $R_1$ and indicating that a cell-specific reference signal is transmitting a resource element in the slot 304, 308. A downlink physical broadcasting channel (PBCH) may correspond to a set of resource elements carrying information to the channel identification system 116. A third subset of slots 310 in the grids 300, 302 indicate that a cell-specific reference signal is transmitting on the same slot number of another port in the telecommunication system 100. In some aspects, resource elements used for transmission of cell-specific reference signals on any of the ports in a slot may not be used for any transmission on any other port in the same slot and may be set to a value of zero. In some aspects, the cell-specific reference signals may be a function of a slot number ($n_s$), an orthogonal frequency-division multiplexing symbol number (l), a cell ID, and a cyclic prefix mode. The cell-specific reference signals mapping to a resource element may be a function of the port number (p), the slot number ($n_s$), the symbol number (l) and the downlink number of resource blocks (RBs).

FIG. 4 shows an example of a graphical mapping of downlink cell-specific reference signals for a 4×4 MIMO telecommunication system corresponding to information that may be stored as instructions 210. The map includes grids 400, 402, 404, 406 representing a first port (e.g., port {0}), a second port (e.g., port {1}), a third port (e.g., port {2}), and a fourth port (e.g., port {3}) respectively. Grid 400 includes slots 408 having an $R_0$ and indicating that a cell-specific reference signal is transmitting a resource element in the grid slot. Grid 402 includes slots 410 having an $R_1$ and indicating that a cell-specific reference signal is transmitting a resource element in the grid slot. Grid 404 includes slots 412 having an $R_2$ and indicating that a cell-specific reference signal is transmitting a resource element in the grid slot. Grid 406 includes slots 412 having an $R_3$ and indicating that a cell-specific reference signal is transmitting a resource element in the grid slot. The information graphically displayed in the maps of FIGS. 3 and 4 may be usable by the channel identification system 116 of FIG. 1 in extracting and generating cell-specific reference signals to identify the channels of the base station 102 corresponding to the downlink signals received by the interface device 200 of FIG. 2 from the ports 112a-n of the base station 102.

Figure 5:
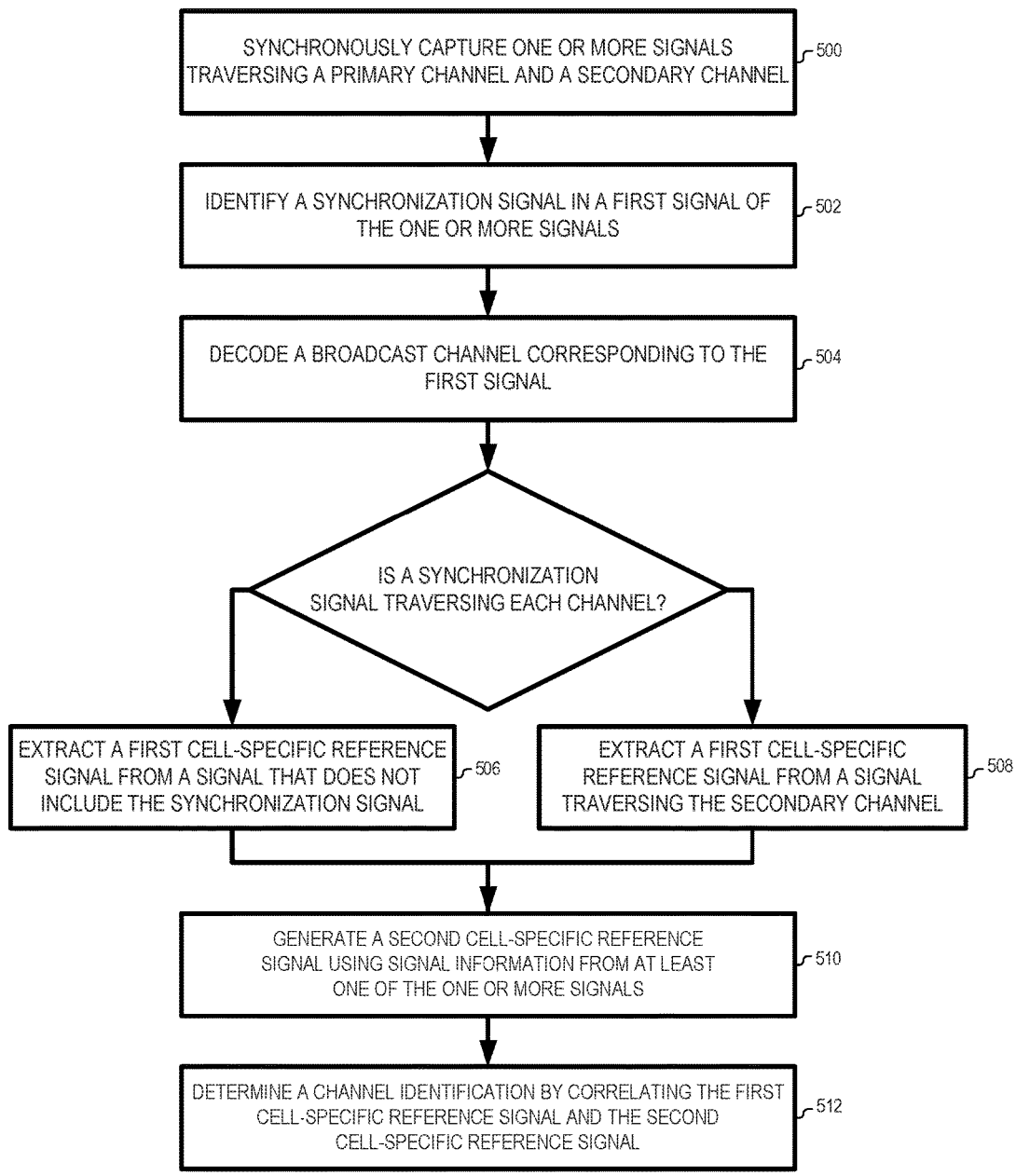
FIG. 5 is a flow chart depicting an example of a process for using the channel identification system of FIG. 2 to identify channel in a MIMO telecommunication system according to one aspect of the present disclosure.

FIG. 5 is a flow chart illustrating an example of a process that may be implemented to identify channels in a telecommunication system. The process, described herein with reference to FIGS. 1 and 2, may be implemented by the channel identification system 116 of FIG. 1 or by any other suitable system or subsystem in a telecommunication system.

In block 500, the channel identification system 116 synchronously captures analog signals transmitted by the base station 102 to the head-end unit 108. In some aspects, downlink signals may be received from the ports 112a-n of the base station 102 by the interface device 200 of the channel identification system 116 via the channels between ports 112a-n and ports 114a-n. The channels may include a primary channel, or the channel having a higher data rate than other channels of the base station 102, and one or more secondary channels. The downlink signals may be received at the ports 114a-n of the head-end unit. In some aspects, the ports 114a-n may correspond to donor ports of the interface device 200. In one example, the base station 102 may include two ports 112a, 112b communicatively coupled to two ports 114a, 114b of the head-end unit 108. In this example, the downlink signals from port 112a may be received at port 114a and the downlink signals from port 112b may be received by port 114b, or the downlink signals from port 112a may be received at port 114b and the downlink signals from port 112b may be received by port 114a.

In some aspects, the downlink signals may be converted from analog to digital. In some aspects, the downlink signals may be digitized by one or more analog-to-digital converters of the interface device 200. The synchronous capture of the digitized downlink signals may include sampling the digitized downlink signals at the same time, i.e., a first sample from a first digitized downlink signal and a second sample from second digitized downlink signal may be associated with the same sampling time. In some examples, the synchronous capture may be performed by the field programmable gate array 202 on a backplane of the head-end unit 108. In some aspects, the captured samples of the digitized downlink signals may be made available to the digital signal processor 204 and stored in the memory device 208.

In block 502, primary and secondary synchronization signals are identified in the synchronously captured samples. In some aspects, the downlink signals may be downsampled (e.g., decimated by 16) to facilitate the identification of the primary and secondary synchronization signals. In some aspects, the primary and secondary synchronization signals may be identified by the measurement receiver 206. In further aspects, the measurement receiver 206 may retrieve the samples from the memory device 208. In other aspects, the measurement receiver 206 may retrieve the samples from the field programmable gate array 202. The primary and secondary synchronization signals may be transmitted from one or more ports 112a-n of the base station 102 as signals embed in the downlink signals transmitted to the head-end unit 108. In some aspects, primary and secondary synchronization signals may be embedded in only a downlink signal on a single channel (e.g., from one of the ports 112a-n). In other aspects, primary and secondary synchronization signals may be embedded in the downlink signals transmitted on multiple or all of the channels (e.g., from multiple or all of ports 112a-n). The primary synchronization signal may be located in a specific OFDM symbol, slot, and sub-frame of a radio frame to enable synchronization of the head-end unit 108 or other equipment in the telecommunication system 100. The secondary synchronization signal may be located in the same sub-frame but in an OFDM symbol adjacent to the primary synchronization signal to provide the channel identification system 116 with a cell identifier corresponding to the channel, or port 112a-n, from which the signal was transmitted. The cell identifier may enable the head-end unit 108 to determine whether the port 112a-n of the base station 102 from which the primary synchronization signal and secondary synchronization signal are transferred corresponds to the primary channel.

In block 504, the broadcast channel (BCH) may be decoded for the digital signal sample(s) including the primary and secondary synchronization signals. In some aspects, decoding the broadcast channel may allow the channel identification system 116 to determine a number of ports transmitting downlink signals from the base station 102 (e.g., 2 ports for a 2×2 MIMO, 4 ports for a 4×4 MIMO, etc.). The broadcast channel may also provide bandwidth and frame information for the ports 112a, 112b of the base station. In some aspects, the broadcast channel may be decoded using known techniques. In one example, the down-sampling may be from 30.72e6 to 1.92e6 Hz since the broadcast channel may be centered at 1.08e6 Hz. Time synchronization may be performed by the measurement receiver 206 subsequent to the down-sampling by relocating the primary and secondary synchronization signals in the down-sampled signals to identify the frame boundaries and slot numbers. For symbols that contain the master information block (MIB) on the broadcast channel, the cyclic prefix may be removed. A fast Fourier transform (FFT) algorithm may be performed for a conversion to the frequency domain for the resource elements. Channel estimation and interpolation may be performed in the sub-frame using cell-specific reference signals. Channel correction may be performed to the resource elements in the frequency domain and the resource elements carrying broadcast channel information may be extracted according to the number of ports. In some aspects, recovery from the space-frequency block coding (SFBC), or, for a case of four ports, a combination of space-frequency block coding and frequency switched transmit diversity (FSTD) may be used. The resource elements may be demodulated and mapped to bit sequence. In some aspects, descrambling, rate de-matching, and Viterbi decoding may also be performed. The cyclic redundancy check (CRC) generated from MIB payload may be checked and compared using an exclusive disjunction operation to zeroes having corresponding 16-bit mask. The master information block information may be extracted. In some aspects, the master information block information may include a downlink bandwidth, physical hybrid-ARQ indicator channel (PHICH) configuration, system frame number (SNF), and a number of ports.

In blocks 506 and 508, a cell-specific reference signal may be extracted. In block 506, the cell-specific reference signal may be extracted from a downlink signal that does not include the primary and secondary synchronization signals based upon the primary and secondary synchronization signals being embedded only in the downlink signals from one port 112a-n of the base station 102. For example, where there are two ports 112a-n corresponding to a primary and secondary channel, the cell-specific reference signal may be included in downlink signals traversing the primary channel or the secondary channel. The cell-specific reference signal may be extracted from the primary channel based upon the synchronization signals being included in downlink signals traversing the secondary channel. The cell-specific reference signal may be extracted from the secondary channel based upon the synchronization signals being included in downlink signals traversing the primary channel. In block 508, a cell-specific reference signal may be extracted from a downlink signal traversing a secondary channel based upon primary and secondary synchronization signals being embedded in both primary and secondary channels.

In blocks 506 and 508, the cell-specific reference signal may be extracted by re-identifying the primary and secondary synchronization signals at a full sampling rate. A search of the primary and secondary synchronization signals may be performed at full rate to achieve more accurate slot synchronization. In some aspects, measurement receiver 206 may re-identify retrieved the digital downlink signal samples from original synchronous captures of the samples stored in the memory device 208. In other aspects, the measurement receiver 206 may up-sample the previously down-sampled digital signal used to identify to the primary and secondary synchronization signals as described in block 504. In some aspects, the result of the search may provide a frame boundary and a slot boundary for the digitized downlink signals. The measurement receiver 206 may use this signal information to convert the samples from the time domain to the frequency domain to determine the cell-specific reference signal based on instruction 210 stored in the memory device 208. In some aspects, the measurement receiver 206 may convert the samples from the time domain to the frequency domain using a fast Fourier transform (FFT) algorithm.

In block 510, a second cell-specific reference signal may be generated from the digitized downlink signals. The second cell-specific reference signal may be generated without using the information from the primary and secondary synchronization signal. In some aspects, the second cell-specific reference signal may serve as a hypothesis to the first cell-specific reference signal. In some aspects, the second cell-specific reference signal may be a Gold sequence and may be reconstructed using instructions 210 in the memory device 208. In some aspects, the second cell-specific reference signal may be generated using known values for the cell identifier, cyclic prefix, slot number, symbol number, and port number for the port 112a-n from which the downlink signal was transmitted. A fast Fourier transform (FFT) algorithm may be used to convert the information from the time domain to the frequency domain to generate the cell-specific reference signals from the downlink signals.

In block 512, the first cell-specific reference signal and the second cell-specific reference signal may be correlated and compared to determine a channel identification for the ports 112a-n. A channel identification may be verified where the two cell-specific reference signal sequences are near-identical. In some aspects, the cell-specific reference signals may be compared based on the location of each cell-specific reference signal and the relative strength of the correlation peak. When a strong correlation at lag zero is found within a given threshold, the hypothesis that the port 112a-n corresponding to the second cell-specific reference signal is from the same port 112a-n as the port 112a-n corresponding to the cell-specific reference signal may be confirmed. In some aspects, the results are logged or otherwise stored in a database. In additional aspects, the channel identification results may be used to determine routing decisions for the downlink signals to the access points. The channel identification results may be discarded where the correlation and comparison is rejected.

In some aspects, the determination of which port 112a-n of the base station 102 or corresponding port 114a-n of the head-end unit 108 may be used by the channel identification system 116 to perform the autocorrelation functions for determining and verifying channel identification may be based on the location of the primary and secondary synchronization signals and, in some cases, the primary and secondary channels identified by the channel identification system 116. In some aspects, a base station provider may locate synchronization signals on one or multiple ports. For example, in a 2×2 MIMO system, synchronization signals may be located on a first port only, on a second port only, or on both a first and second port (e.g., ports 112a, 112b of the base station 102 of FIG. 1). The ports may be mapped to ports in the telecommunication system (e.g., ports 114a, 114b of the head-end unit 108). The mapping of the ports 112a, 112b to ports 114a, 114b may be direct (e.g., port 112a to port 114a, port 112b to port 114b as shown in FIG. 1) or may be inversed (e.g., port 112a to port 114b, port 112b to port 114a) to provide six potential scenarios for determining the ports used for correlation.

In a first scenario, the ports 112a, 112b may be directly connected to ports 114a, 114b and the primary and secondary synchronization signals may be embedded in a downlink signal received at port 114a. The direct connection informs that the synchronization signals were transmitted from port 112a to port 114a and port 112b to port 114b. Ports 112a, 114a may be associated with the primary channel. The first cell-specific reference signal may be extracted from the port associated with the non-primary channel, or secondary channel, (e.g., port 114b). In this scenario, the second cell-specific reference signal may be generated using information decoded from downlink signals received at port 114a according to some aspects.

In a second scenario, the ports 112a, 112b may be reversely connected to ports 114a, 114b and the primary and secondary synchronization signals may be embedded in a downlink signal received at port 114b. Ports 112a, 114b may be associated with the primary channel. The first cell-specific reference signal may be extracted from the port associated with the secondary channel (e.g., port 114a). In this scenario, the second cell-specific reference signal may be generated using information decoded from downlink signals received at port 114b.

In a third scenario, the ports 112a, 112b may be directly connected to ports 114a, 114b and the primary and secondary synchronization signals may be embedded in downlink signals received at both ports 114a, 114b. Ports 112a, 114a may be associated with the primary channel. The first cell-specific reference signal may be extracted from the port associated with the secondary channel (e.g., port 114b). In this scenario, the second cell-specific reference signal may be generated using information decoded from downlink signals received at port 114a.

In a fourth scenario, a reverse scenario of the third scenario, the ports 112a, 112b may be reversely connected to ports 114a, 114b and the primary and secondary synchronization signals may be embedded in downlink signals received at both ports 114a, 114b. The reverse connection informs that the synchronization signals were transmitted from port 112a to port 114b and from port 112b to port 114a. Ports 112a, 114b may be associated with the primary channel. The first cell-specific reference signal may be extracted from the port associated with the secondary channel (e.g., port 114a). In this scenario, the second cell-specific reference signal may be generated using information decoded from downlink signals received at port 114b.

In a fifth scenario, the ports 112a, 112b may be directly connected to ports 114a, 114b and the primary and secondary synchronization signals may be embedded in a downlink signal received at port 114b. Ports 112a, 114a may be associated with the primary channel. The first cell-specific reference signal may be extracted from the port associated with the primary channel (e.g., port 114a). In this scenario, the second cell-specific reference signal may be generated using information decoded from downlink signals received at port 114b.

In a sixth scenario, the ports 112a, 112b may be reversely connected to ports 114a, 114b and the primary and secondary synchronization signals may be embedded in a downlink signal received at port 114a. Ports 112a, 114b may be associated with the primary channel. The first cell-specific reference signal may be extracted from the port associated with the primary channel (e.g., port 114b). In this scenario, the second cell-specific reference signal may be generated using information decoded from downlink signals received at port 114a.

Although a 2×2 MIMO system is described, the methods for determining the ports 112a-n, 114a-n for correlation of the cell-specific reference signals may be applied to 4×4 MIMO systems with additional scenarios. Similarly, although the six scenarios describe specific ports 112a-b, 114a-b and associated channels for correlation in a 2×2 MIMO system, downlink signals from various combinations of ports 112a-b, 114a-b may be used for correlation without departing from the scope of the present disclosures.

Figure 6:
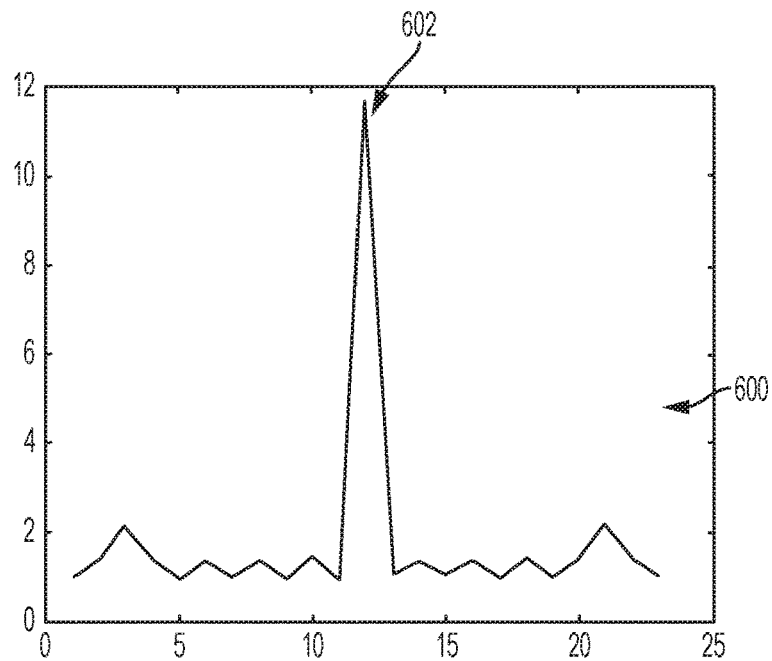
FIG. 6 is a graph simulation illustrating an example of a successful correlation of cell-specific reference signal sequences according to one aspect of the present disclosure.
Figure 7:
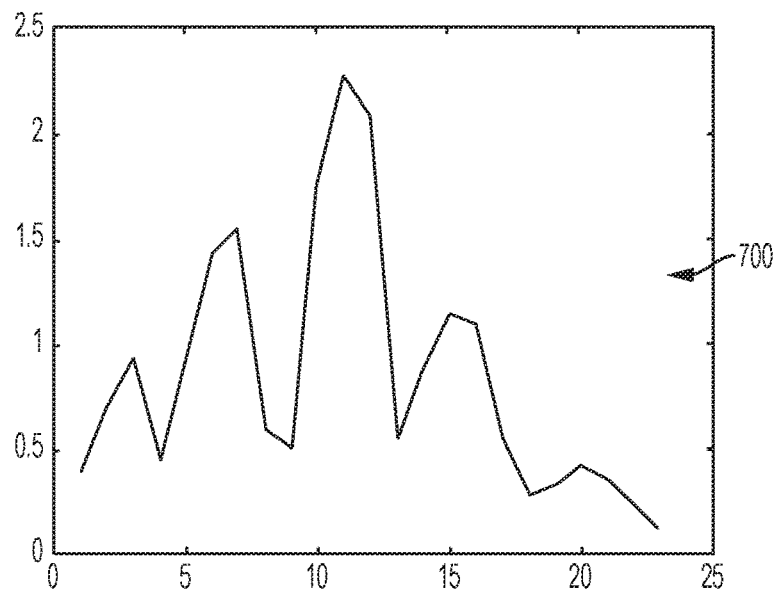
FIG. 7 is a graph simulation illustrating an example of an unsuccessful correlation of cell-specific reference signal sequences according to one aspect of the present disclosure.

In some aspects, a correlation as described in block 510 of FIG. 5 may be graphically represented. For example, MATLAB scripts may be used to analyze correlation of the first and second cell-specific reference signals. FIGS. 6 and 7 include graphs illustrating examples of simulated results of the correlation and comparison of the cell-specific reference signal sequences in a 2×2 MIMO system.

In FIG. 6, graph 600 represents a successful correlation of the first and second cell-specific reference signals. The x-axis may represent offset or lag and the y-axis may represent an absolute value. In this example, six resource blocks of the cell-specific reference signals are used in the simulation. But, in some aspects, decoding the broadcast channel prior to correlation may provide signal information such as bandwidth information that may allow for longer sequences. The peak 602 may represent a match between the first and second cell-specific reference signals, indicating a strong correlation at the zero lag (e.g., twelve) of the correlation.

FIG. 7 shows a graph 700 indicating an unsuccessful correlation. The correlation may be the equivalent to correlating a known cell-specific reference signal Gold sequence with random noise.

The foregoing description of the examples, including illustrated examples, has been presented only for the purpose of illustration and description and is not intended to be exhaustive or to limit the subject matter to the precise forms disclosed. Numerous modifications, adaptations, and uses thereof will be apparent to those skilled in the art without departing from the scope of this disclosure. The illustrative examples described above are given to introduce the reader to the general subject matter discussed here and are not intended to limit the scope of the disclosed concepts.

What is claimed is:

1. A channel identification system for a MIMO telecommunication system wirelessly communicating with terminal devices, comprising:
    an interface device communicatively couplable to a first port and a second port of a base station for receiving downlink signals on channels corresponding to the first port and the second port; and
    a processing device disposed in the MIMO telecommunication system, wherein the processing device is couplable to the interface device and has instructions that are executable by the processing device and are configured to cause the processing device to:
        decode a broadcast channel for a signal of the downlink signals having an embedded synchronization signal;
        extract a first cell-specific reference signal from one of:
            (a) a first downlink signal of the downlink signals that does not include the embedded synchronization signal or (b) a second downlink signal of the downlink signals that includes the embedded synchronization signal and is associated with a secondary channel of the channels;
        generate a second cell-specific reference signal using signal information from at least one of the downlink signals; and
        determine a channel identification corresponding to at least one channel of the channels by correlating the first cell-specific reference signal and the second cell-specific reference signal.

2. The channel identification system of claim 1, wherein the processing device includes a memory device having instructions executable by the processing device for causing the processing device to extract the first cell-specific reference signal using a cell identifier, a cyclic prefix, a slot number, a symbol number, or a port number corresponding to a sample of the first downlink signal or the second downlink signal.

3. The channel identification system of claim 1, further including a memory device for storing digital samples of the downlink signals useable by the processing device to generate the second cell-specific reference signal.

4. The channel identification system of claim 1, wherein the processing device includes a memory device having instructions executable by the processing device for causing the processing device to generate the second cell-specific reference signal using a cell identifier, a cyclic prefix, a slot number, a symbol number, or a port number corresponding to a stored sample of at least one of the downlink signals.

5. The channel identification system of claim 1, wherein the processing device includes at least a field-programmable gate array communicatively coupled to the interface device and configured to synchronously capture samples of the downlink signals received from the base station.

6. The channel identification system of claim 1, wherein the processing device includes at least a measurement receiver positionable to receive samples of the downlink signals received from the base station and configured to identify a primary synchronization signal and a secondary synchronization signal embedded in at least one of the downlink signals.

7. The channel identification system of claim 1, wherein the processing device is disposed in a head-end unit of the MIMO telecommunication system.

8. A multiple-input, multiple output telecommunication system, comprising:
    a head-end unit communicatively couplable to a first port and a second port of a base station for receiving downlink signals via channels corresponding to the first port and the second port, the head-end unit being configured to:
        identify a synchronization signal embedded in at least one of the downlink signals;
        decode a broadcast channel for the at least one of the downlink signals having an embedded synchronization signal to determine a total number of ports transmitting the downlink signals;
        extract a first cell-specific reference signal from one of
            (a) a first downlink signal of the downlink signals that does not include the embedded synchronization signal or (b) a second downlink signal of the downlink signals that includes the embedded synchronization signal and is associated with a secondary channel of the channels;
        generate a second cell-specific reference signal using signal information from the at least one of the downlink signals; and
        determine a channel identification for each of the channels by correlating the first cell-specific reference signal and the second cell-specific reference signal; and
    one or more access points communicatively couplable to the head-end unit to receive the downlink signals and channel properties of the base station corresponding to the channel identification.

9. The multiple-input, multiple output telecommunication system of claim 8, wherein the head-end unit includes two ports positionable in the multiple-input, multiple output telecommunication system to receive the downlink signals from two base station ports.

10. The multiple-input, multiple output telecommunication system of claim 8, wherein the head-end unit includes four ports positionable in the multiple-input, multiple output telecommunication system to receive the downlink signals from four base station ports.

11. The multiple-input, multiple output telecommunication system of claim 8, wherein the head-end unit includes:
    a processing device; and
    a memory device having instructions executable by the processing device for causing the processing device to extract the first cell-specific reference signal using a cell identifier, a cyclic prefix, a slot number, a symbol number, or a port number corresponding to a sample of the first downlink signal or the second downlink signal.

12. The multiple-input, multiple output telecommunication system of claim 8, wherein the head-end unit includes:
    a processing device; and
    a memory device having instructions executable by the processing device for causing the processing device to generate the second cell-specific reference signal using the signal information, the signal information including one or more of a cell identifier, a cyclic prefix, a slot number, a symbol number, or a port number.

13. The multiple-input, multiple output telecommunication system of claim 8, wherein the head-end unit includes an interface device configured to receive the downlink signals and generate digital samples of the downlink signals.

14. The multiple-input, multiple output telecommunication system of claim 13, wherein the head-end unit includes:
   a processing device for which instructions executable by the processing device are configured to cause the processing device to synchronously capture the digital samples of the downlink signals; and
   a memory device for storing the digital samples of the downlink signals.

15. A method, wherein the method is performed by a MIMO telecommunication system wirelessly communicating with terminal devices, the method comprising:
   receiving a plurality of signals from ports of a base station, the ports corresponding to at least a primary channel and a secondary channel;
   synchronously capturing digital samples of the plurality of signals; and
   decoding a broadcast channel based on a location of an embedded synchronization signal;
   extracting a first cell-specific reference signal from a signal of the plurality of signals, the signal including one of (a) a first signal having the embedded synchronization signal and received via the secondary channel or (b) a second signal that does not have the embedded synchronization signal;
   generating a second cell-specific reference signal using signal information from at least one of the plurality of signals; and
   determining a channel identification corresponding to a port of the base station by correlating the first cell-specific reference signal and the second cell-specific reference signal.

16. The method of claim 15, further including:
   identifying one or more primary or secondary synchronization signals subsequent to down-sampling the plurality of signals; and
   re-identifying the one or more primary or secondary synchronization signals in a stored sample of the first signal or the second signal at a full sampling rate.

17. The method of claim 15, wherein generating the second cell-specific reference signal includes using a cell identifier, a cyclic prefix, a slot number, a symbol number, or a port number corresponding to a stored sample of the one of the plurality of signals.

\* \* \* \* \*